United States Patent [19]
Hosoya

[11] Patent Number: 5,638,345
[45] Date of Patent: Jun. 10, 1997

[54] INFORMATION RECORDING AND/OR REPRODUCING APPARATUS AND METHOD FOR USE WITH A MULTI-TRACK OPTICAL RECORDING MEDIUM

[75] Inventor: Hideki Hosoya, Yokohama, Japan

[73] Assignee: Canon Kabushiki Kaisha, Tokyo, Japan

[21] Appl. No.: 287,266

[22] Filed: Aug. 8, 1994

[30] Foreign Application Priority Data

Aug. 25, 1993 [JP] Japan ................... 5-210553
Aug. 25, 1993 [JP] Japan ................... 5-210554

[51] Int. Cl.$^6$ .................... G11B 17/22; G06K 7/10
[52] U.S. Cl. .................... 369/32; 369/58; 235/454
[58] Field of Search .................... 369/15, 32, 30, 369/47, 48, 54, 58, 59, 44.14, 44.26, 44.31, 44.39, 275.1, 275.3, 275.4; 235/454, 476

[56] References Cited

U.S. PATENT DOCUMENTS

| | | | |
|---|---|---|---|
| 4,885,458 | 12/1989 | Horiguchi et al. | 360/2 X |
| 4,979,159 | 12/1990 | Tsuruoka et al. | 369/58 |
| 4,982,391 | 1/1991 | Sakagami et al. | 369/32 |
| 4,998,009 | 3/1991 | Iijima et al. | 369/275.3 X |
| 5,204,514 | 4/1993 | Horiguchi | 235/454 |
| 5,247,499 | 9/1993 | Hayashi et al. | 369/32 |
| 5,293,568 | 3/1994 | Oshiba et al. | 369/32 |
| 5,410,137 | 4/1995 | Ichikawa | 369/44.32 X |

FOREIGN PATENT DOCUMENTS

| | | |
|---|---|---|
| 0278760 | 8/1988 | European Pat. Off. . |
| 62-239345 | 10/1987 | Japan . |
| 2-203467 | 8/1990 | Japan . |
| 2221563 | 2/1990 | United Kingdom . |

OTHER PUBLICATIONS

Patent Abstracts of Japan, Kokai No. 4–98623, vol. 16, No. 333, Jul. 1992.

*Primary Examiner*—Ali Neyzari
*Attorney, Agent, or Firm*—Fitzpatrick, Cella, Harper & Scinto

[57] ABSTRACT

An information recording and/or reproducing apparatus which can prohibit an optical head from trying to access a data track which does not exist on the optical recording medium. The information recording and/or reproducing apparatus is used with an optical recording medium having a plurality of tracks. The information recording and/or reproducing apparatus comprises an optical head which irradiates the optical recording medium with a light beam and detects reflected light from the optical recording medium, a device for controlling the apparatus so as to read information about a number of the tracks of the optical recording medium, and memorize the information as an initial action. The optical head is moved by a driving device within a range according to the memorized information.

11 Claims, 7 Drawing Sheets

INFORMATION RECORDING AND/OR REPRODUCING APPARATUS AND METHOD FOR USE WITH A MULTI-TRACK OPTICAL RECORDING MEDIUM

BACKGROUND OF THE INVENTION

1. Field of the Invention

This invention relates to an information recording and/or reproducing apparatus capable of recording information on an optical recording medium with a light beam, or reproducing information from an optical recording medium with a light beam. The invention also relates to an optical recording medium capable of recording and/or reproducing information with a light beam.

2. Related Background Art

Hitherto, as an information recording medium for recording and/or reproducing information, there have been known magnetic recording media capable of recording and/or reproducing information magnetically (for example, floppy disks and magnetic cards), and optical recording media capable of recording and reproducing information with a light beam.

There also has been known a disk-like or tape-like medium for use as an optical recording medium.

It is considered that optical cards will be used in many ways, because of easy productivity, good portability, and a good accessibility.

Figure 1:
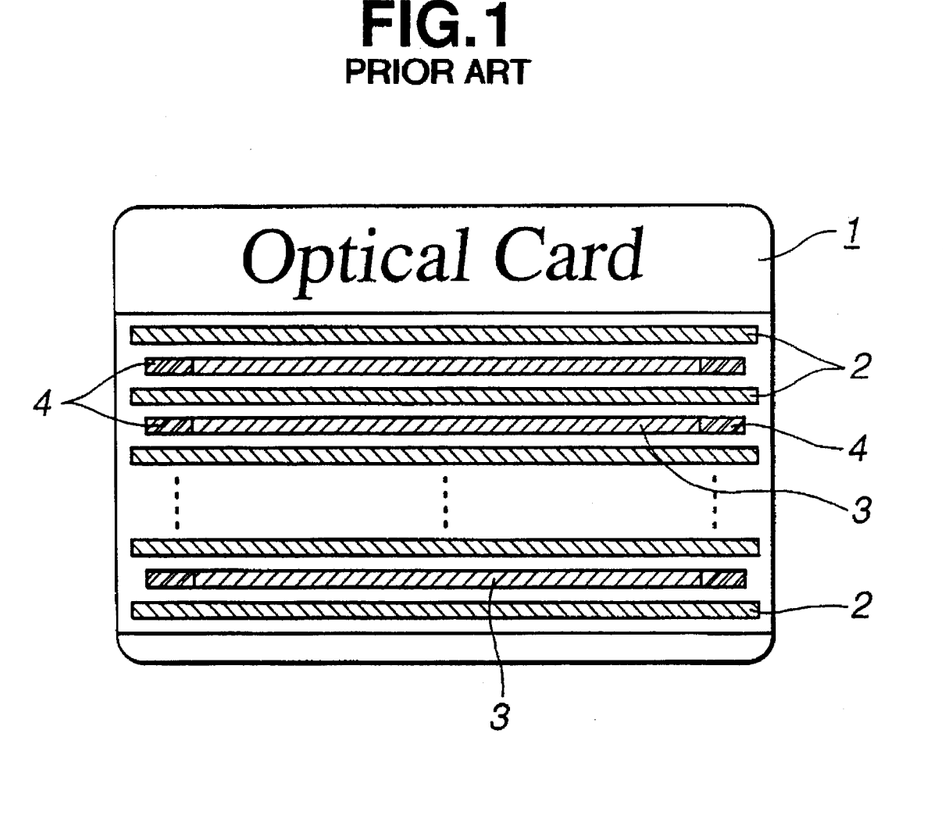
FIG. 1 is a typical plan view for illustrating a conventional optical card.

FIG. 1 is a plan view of a typical, conventional optical recording medium as, for example, disclosed in Japanese Laid-Open Patent Application JP-A-02-203467.

Referring to FIG. 1, 1 is an optical card having a rectangular plane shape, with a plurality of tracking tracks 2 running parallel to each other. Between each pair of tracking tracks 2 there are provided data tracks 3 in which information is recorded with a light beam, there being a plurality of data tracks 3 running parallel to each other.

The tracking tracks 2 are used for registration of the position of the recording light beam and/or reproducing light beam when recording data in the data tracks 3 or reproducing data recorded in the data tracks 3.

At both ends of the data tracks 3 there is a track identifier part 4 (hereinafter called a "track ID part 4"). The track ID part 4 contains information that shows a position of each data track 3 and/or address information relating to the data track. This information is previously recorded in the track ID part 4, i.e., is preformatted. Each data track 3 is divided into one or more minimum recording sectors.

Information is recorded in the optical card described above by scanning a light beam modulated in accordance with the information on the data track 3 and focused to a small spot on the card, and making an optically detectable mark in the recording layer.

Any information recorded on the optical card is reproduced by scanning on the data track a light beam having a fixed power which is not capable of recording, and detecting a difference of a quantity of reflected light or transmitted light between the mark and another part of the card.

An information recording and/or reproducing apparatus which records information on an optical card or reproduces information recorded on the optical card may have automatic focusing control means that controls the size of a light spot on the optical card automatically, and automatic tracking control means that controls the position of the light spot automatically.

An outline of a convention optical card and a conventional information recording apparatus has been given above. Recently, however, there has been suggested a hybrid card, which has not only an optical recording layer but also other information storage means, for example, an IC module, a magnetic stripe or embossed visible information.

Figure 2A:
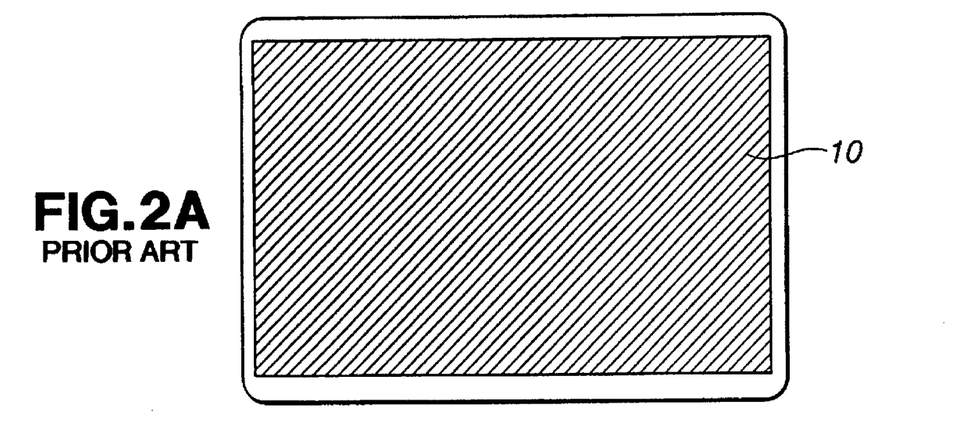
FIGS. 2(a) to 2(c) illustrate various kinds of optical cards.
Figure 2B:
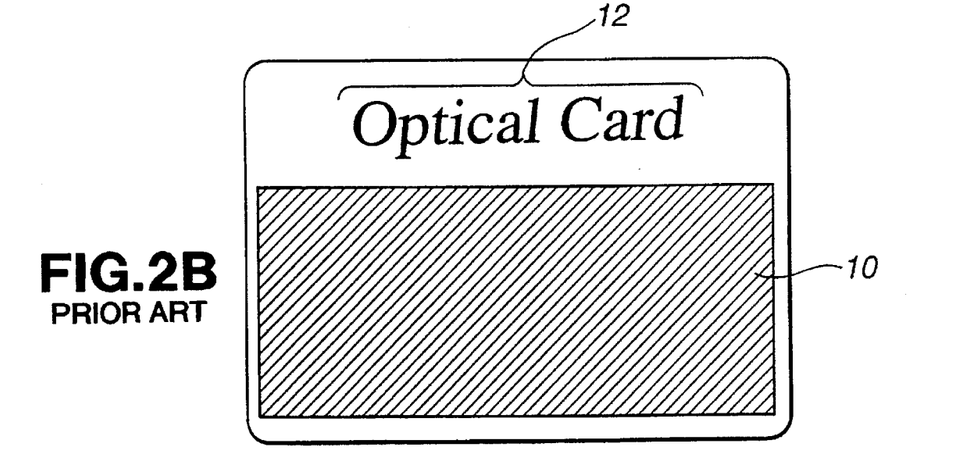
Figure 2C:
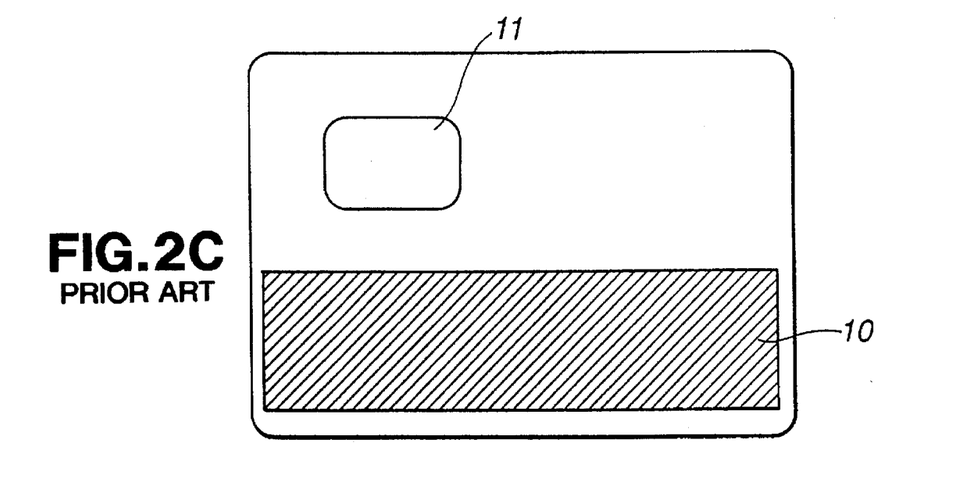

Furthermore, there have been various kinds of optical cards that have different recording capacity, that is, having a different number of data tracks. FIGS. 2(a)-2(c) are examples of typical views of such optical cards. FIG. 2(a) shows an optical card which has an optical recording area 10 covering almost the whole surface. FIG. 2(b) shows an optical card having visible information (embossed "optical card") with the optical card's recording area 10 being decreased compared to the FIG. 2(a) card. FIG. 2(c) shows an optical card having an IC module so as to have both functions of an optical card and an IC card, with the optical card's recording area 10 being decreased so as to accommodate the IC module.

However, in practice with such various optical recording media having different recording capacity, there is a problem as follows. Access of the recording light beam and/or reproducing light beam to the data track 3 is usually achieved using the information recorded in the track ID part which shows a physical position of the data track. Thus, when the recording and/or reproducing apparatus accepts a track number to be accessed in some form from overall controlling means (for example, a host computer), the recording and/or reproducing apparatus searches the data track to be accessed in accordance with the information of the track ID part to access a desired data track.

Thus, hitherto, when the recording and/or reproducing apparatus accepts a track number, which the optical card to be read does not have, from the overall control means, the apparatus tries to access the track. As a result, the automatic focusing control and/or automatic tracking control is out of control, and then a recording and/or a reproducing error may happen and a lot of time may elapse before the controls resume.

In JP-A-2-203467 described above, the applicant of the present invention discloses an information recording and/or reproducing apparatus for plural types of optical recording media having a discriminating means for discriminating between plural types of optical media, and control means for controlling an area to be recorded or reproduced in accordance with the result of the discrimination by the discriminating means. However, there is no disclosure about a control method for accommodating plural types of optical recording means which have different numbers of tracks.

JP-A-62-239345 discloses an information recording medium provided with an optically detectable mark which shows a kind of an optical recording medium at a data track. However, there is no disclosure of an optical recording medium which complies with the purpose of the present invention.

SUMMARY OF THE INVENTION

In view of the above problems, an object of the present invention is to provide a high reliability information recording and/or reproducing apparatus in which the development of errors is at least reduced even though recording and/or reproducing on various different kinds of optical recording media.

Another object of the present invention is to provide an optical recording medium which enables an information recording and/or reproducing apparatus to recognize the kind of optical recording medium without providing any special mark which decreases the recording capacity of the optical recording medium.

Another object of the present invention is to provide an optical recording medium which enables an information recording and/or reproducing apparatus to recognize the type of optical recording medium without always providing a special mark on the optical recording medium.

According to a first aspect of the present invention, there is provided an information recording and/or reproducing apparatus used with an optical recording medium having a plurality of tracks, which comprises an optical head which irradiates the optical recording medium with a light beam and detects reflected light from the optical recording medium, means for driving the optical head to move the optical head to a desired track, and means for controlling the apparatus to read information about a number of the tracks of the optical recording medium and memorized the information as an initial action, and to move the optical head by the driving means within a range which corresponds to the memorized information.

According to another aspect of the present invention, there is provided an optical recording medium comprising a plurality of data tracks running parallel to each other, and a track ID part provided on each data track, the track ID part including information which shows an address of each data track, wherein the track ID part is provided with information about the kind of optical recording medium.

A number of embodiments of the invention will now be described with reference to the accompanying drawings, by way of example only.

DETAILED DESCRIPTION OF THE INVENTION

Hereinafter, an embodiment of the present invention will be explained in more detail with reference to the Figures.

Figure 3:
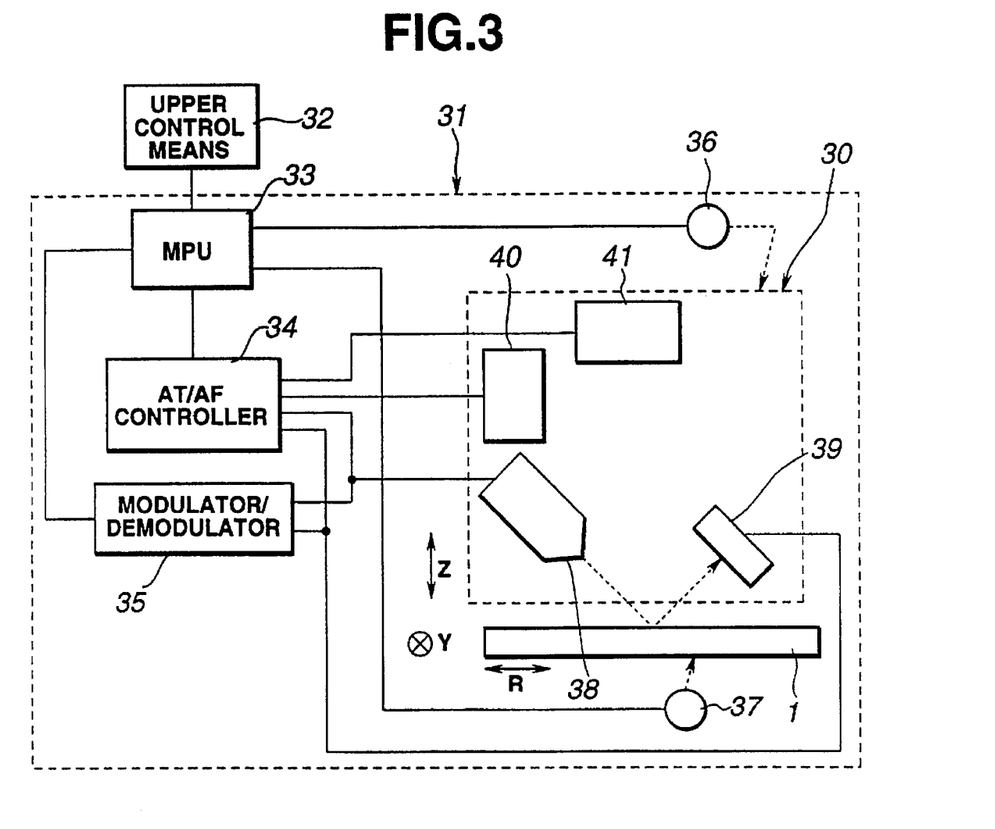
FIG. 3 shows an embodiment of a block diagram of the information recording and/or reproducing apparatus of the present invention.

FIG. 3 is a block diagram of an information recording and/or reproducing apparatus in accordance with an embodiment of the present invention. Referring to FIG. 3, the information recording and/or reproducing apparatus indicated as 31 is generally called an "optical card drive"—an apparatus for recording information in an optical card and/or reproducing information recorded in an optical card. The optical card drive 31 is connected to a host computer 32 as an upper control means.

Figure 4:
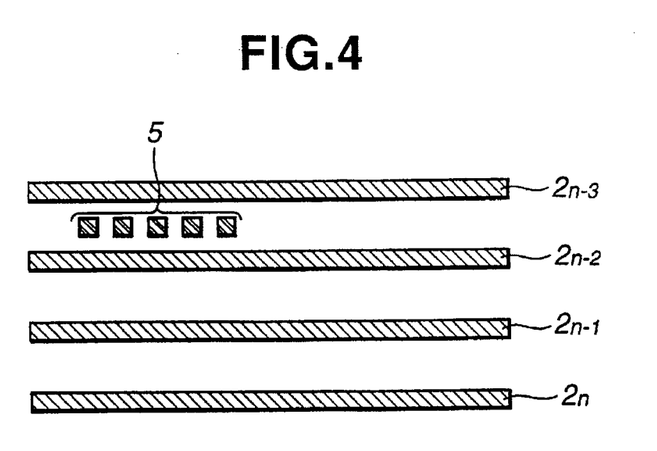
FIG. 4 illustrates an optical card provided with a mark for indicating the kind of optical card.

The optical card 1 is preferably an optical card of the form shown in FIG. 4, of which recorded information about a number of the tracks is included in an optically detectable form.

The information recording and/or reproducing apparatus 31 comprises a means (not shown in FIG. 3) for conveying the optical card 1 into the apparatus, means for moving the optical card 1 reciprocally in the direction "R" shown in FIG. 3, and means for ejecting the optical card from the apparatus 31. In FIG. 3, the means for moving the optical card 1 is shown as a motor 37.

The apparatus 31 has an optical head 30 which forms a light spot on the optical card while recording and/or reproducing, and detects reflected light from the optical card. The apparatus 31 includes an optical system 38 comprising a light source and a lens, which directs a light beam on the optical card 1. A light detector 39 detects the reflected light from the optical card 1.

The apparatus is also provided with an actuator 40 for automatic focusing control, and a further actuator 41 for automatic tracking control. The actuator 40 is for moving a part of the optical system 38 to change a focal point of the light beam in the direction of "Z" shown in FIG. 3, that is, the vertical direction toward the plane of the optical card 1, to perform automatic focusing.

The actuator 41 is arranged to move part of optical system 38 so as to move the focal point slightly in the direction of "Y" shown in FIG. 1 such that the light spot crosses the tracks, i.e., perpendicular to the direction "R" and the direction "Z", to perform automatic tracking.

Further, the apparatus is provided with a motor 36 for moving the optical head as a means for moving the optical head 30 in the direction "Y" to move the beam spot to a desired track.

The apparatus is provided with a modulator/demodulator 35, which modulates an information signal which shows information to be recorded to the optical card 1 and outputs the modulated information signal to the optical system 38, and which demodulates a signal from the light detector 39 and outputs a demodulated signal. The light beam from the light source in the optical system 38 is modulated by a modulated signal from the modulator/demodulator 35, thus information corresponding to the information signal is recorded in the optical card 1.

The apparatus is also provided with an automatic focusing and automatic tracking controller 34 effective to move the actuators 40 and 41 according to a signal from the light detector 39 and the modulated signal from the modulator/demodulator 35. The controller 34 is for deciding a control quantity of each actuator 40 and 41 according to the output from the light detector 39, and for controlling the automatic focusing and automatic tracking. The modulated signal is used as a reference signal of an output signal from the light detector 39.

Further, the apparatus is provided with a microprocessor unit (MPU) 33 for controlling the apparatus 31 totally, and controlling communication of data between the host computer 32 and the apparatus 31. The MPU 33 comprises a read only memory (ROM) and a random access memory (RAM). The MPU 33 controls the motors 36 and 37, and controls movement of the optical head 30 in accordance with a number of tracks which are recognized by the apparatus 31 when the optical card 1 is inserted into the apparatus 31. That is, the MPU 33 keeps information about a number of tracks which are recognized by the apparatus 31 by the initial action of the insertion of the card 1 into the apparatus 31.

When the apparatus is going to access a desired track for recording and/or reproducing according to the instruction from the host computer 32, the MPU 33 reads the information about the number of tracks from the RAM, and controls movement of the optical head in the direction that crosses the tracks within the information about the number of the tracks.

Next, a preferred embodiment of the present invention will be explained in more detail. First, the initial action at the insertion of the optical card 1 will be explained with reference to FIG. 5. In the present embodiment, an optical card provided with an optically detectable mark which shows the track number type of the optical card is used, and hereinafter, a type of card having a particular number of tracks is called a "card type". The mark which shows the card type is the same as the mark 5 shown in FIG. 4.

Figure 5:
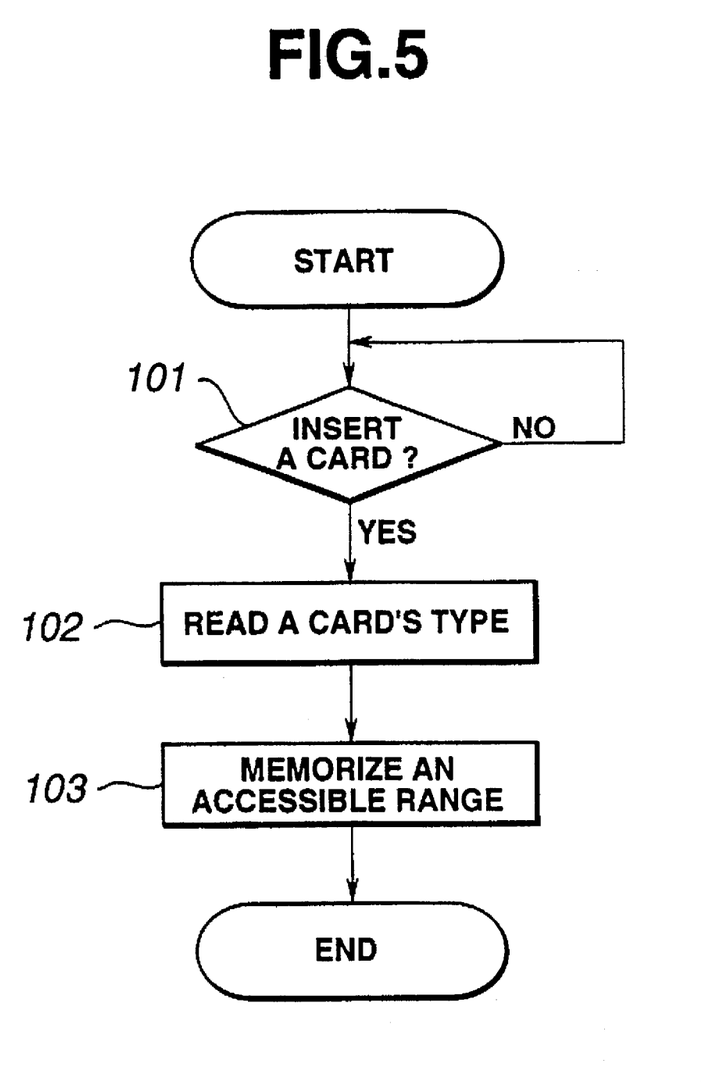
FIG. 5 shows a flow chart illustrating an initial action when inserting an optical card into the information recording and/or reproducing apparatus.

Referring to FIG. 5, in step 101, the apparatus 31 checks whether the optical card has been inserted to the apparatus 31, and if it has not been inserted, the apparatus waits for insertion of the optical card 1.

When the apparatus recognizes that the optical card 1 has been inserted, the MPU 33 controls the motor 36 for moving the optical head 30 so as to move the optical head 30 in the direction "Y" and thereby move the light beam spot to the track provided with the mark (in FIG. 4, the track provided with the mark is a data track between tracking track 2(n-2) and 2(n-3)). Then, in step 102, the MPU 33 controls the motor 37 for moving the optical card 1 to scan the light beam spot on the track, and read the mark.

In step 103, the MPU 33 analyzes the number of tracks on the optical card 1 and the card type and memorizes the result in the RAM as an accessible range. The accessible range means information of the range of real tracks that the optical head can actually access. The information shown may correspond to the accessible range as follows, for example, if the card type is "1", then the accessible range is "from track number 1 to track number 1100", and if the card type is "2", then the accessible range is "from track number 1 to track number 2500". The relation between the card type and the accessible range may preferably be prerecorded in the ROM of the MPU 33. Hereinabove, the initial action is finished.

Secondly, a recording and/or reproducing process will be explained with reference to FIG. 6.

Figure 6:
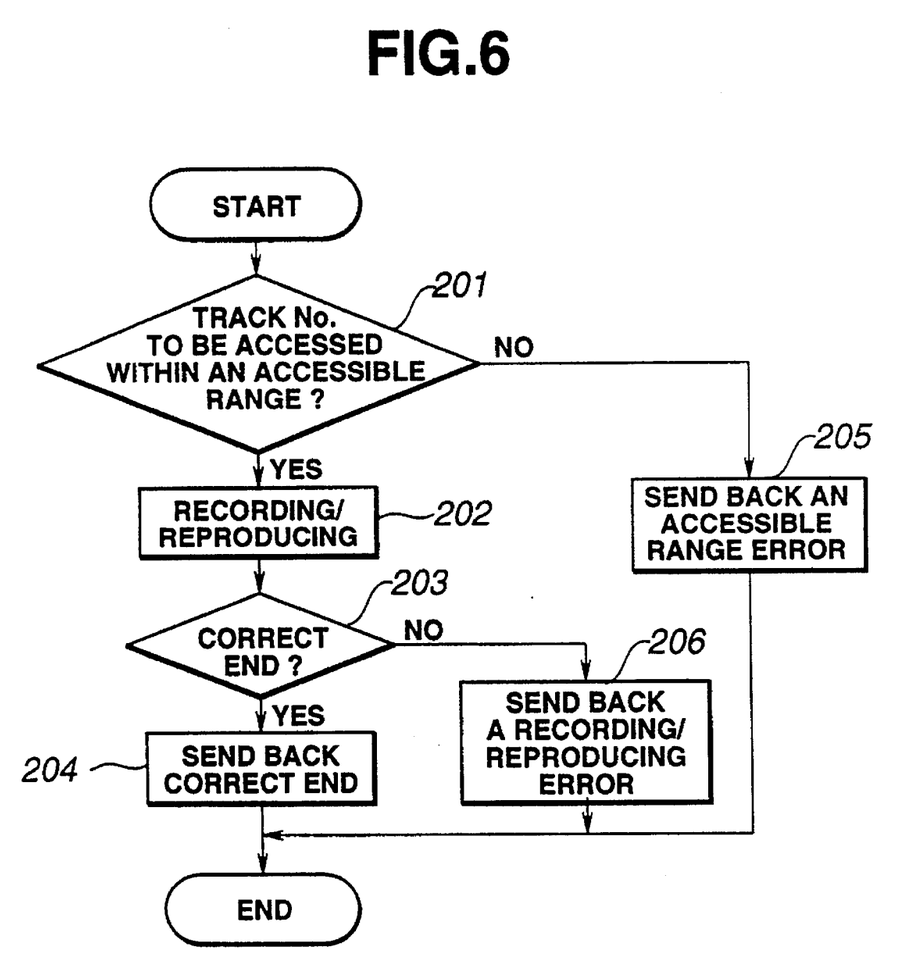
FIG. 6 shows a flow chart illustrating a recording and/or reproducing process of the optical card according to an embodiment of the present invention.

Referring to FIG. 6, in step 201, when the host computer 32 instructs the apparatus 31 to record information in the optical card 1, or to reproduce information recorded in the optical card 1, the MPU 33 judges whether the track address to be recorded or to be reproduced, which is directed from the host computer 32, is within the accessible range of the optical card 1 inserted in the apparatus 31.

This judgement is done by comparing the directed track address to the accessible range recorded in the RAM during the initial action described above. In step 205, if the directed track address is not within the accessible range, the MPU 33 sends back an error signal to the host computer 32 without moving the optical head 30 toward the directed track, and finishes the accessing process. In step 202, if the directed track address is within the accessible range, the apparatus 301 records information in the optical card 1 or reproduces information recorded in the optical card 1.

The action for recording and/or reproducing is done as follows. The MPU 33 controls the motor 36 to move the optical head 30 in the direction "Y", and to move the light beam to the directed track, and controls the motor 37 to scan the light beam over the directed track.

When the above action is done, the automatic focusing control and automatic tracking control are carried out.

In step 203, the MPU 33 checks whether the recording/reproducing is carried out correctly by processing an error correcting code. In step 204, if the recording/reproducing is carried out correctly, the MPU 33 sends back a signal that the action is finished correctly to the host computer 32, to finish the processing. In step 206, if the recording/reproducing is not carried out correctly, the MPU 33 sends back a recording/reproducing error signal to the host computer 32, to finish the processing.

According to the above embodiment, processing is performed by analyzing the card type read during the initial action, and memorizing an accessible range to the RAM. However, processing is not limited to the above embodiment, but may, for example, be performed by memorizing a card type itself in the RAM, operating an accessible range from the card type when recording/reproducing the information, and comparing the directed track address to the accessible range.

In the present invention, the optical card including information about the number of tracks as an optically detectable mark is not limited to the optical card used in the above embodiment. For example, other optical cards on which are recorded the number of tracks, or the accessible range of tracks as a value on at least one area of the card may be used. This information may be recorded as other than an optically detectable mark, for example, a magnetic or mechanically detectable mark or marks may be used.

Processing may be done by memorizing the number of tracks or accessible range itself in the RAM, and comparing a directed track number to the value memorized in the RAM.

Hereinafter, an optical recording medium having a preferred structure according to an embodiment of the present invention will by explained with reference to FIGS. 7 to 10.

Figure 7:
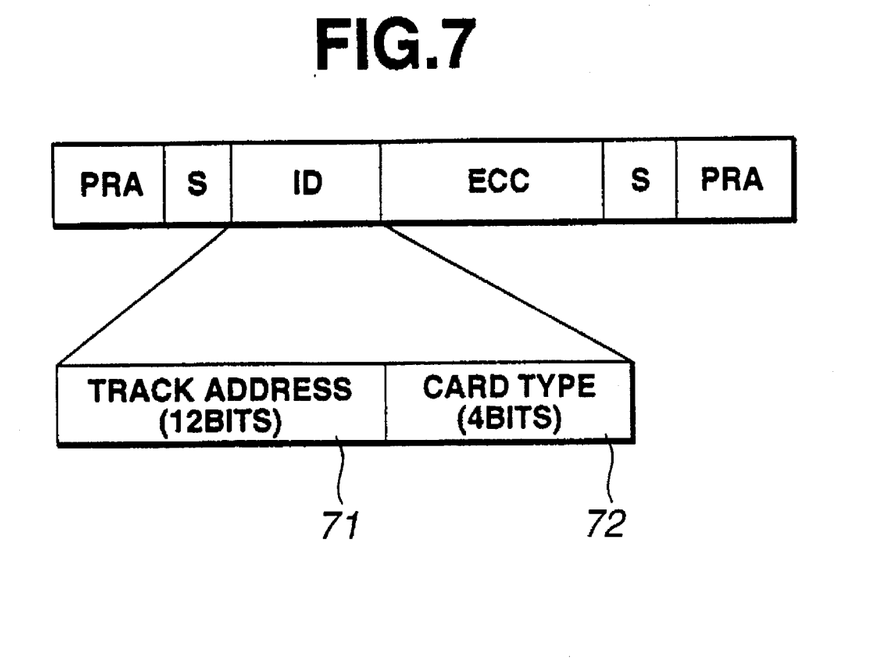
FIG. 7 illustrates a composition of a field of an optical card's track ID part according to the first embodiment of the present invention.

FIG. 7 is a schematic view for illustrating a composition of track ID part 4 of one embodiment of an optical card according to the present invention.

This optical card has an area 72 which shows a card type in the track ID part 4, and in this respect, this optical card is different from the optical card shown in FIG. 1.

The track ID part 4 comprises a preamble part (PRA) which is a pattern for synchronous pull-in of generating a self reproducing clock, a synchronous signal field (S), an identification field (ID), an error correcting code field (ECC), a synchronous signal field (S) and a preamble part (PRA) in this order.

The identification field (ID) comprises an area 71 which shows a track address, and an area 72 which shows a card type.

The synchronous field (S) is provided for identifying the head of the area 71 which shows the track address.

The error correction code (ECC) is a field provided with an error Correction code for increasing the reliability of reproducing the track ID information.

The preamble part (PRA) and the synchronous signal field (S) are provided at both ends of the track ID part 4 so as to be capable of reproducing information recorded in the track ID part 4 from both directions.

The number of tracks of the optical card is generally 3500 to 4000, even though the optical card has a recording area which covers almost the whole surface, like the optical card shown in FIG. 2(a).

Thus, an area of 12 bits is sufficient for recording the track address in the track ID part 4.

On the other hand, it is preferable to treat information to be recorded in the optical card in blocks of 8 bits. Thus, an area of 2 bytes (=16 bits) is secured in the track ID part 4.

The inventors of the present invention consider that 12 information bits are enough for indicating a track address of an optical card. The optical card of the present embodiment is characterized in having a track ID part provided with an area 71 which indicates a track address and an area 72 which indicates a card type. Preferably, 12 information bits are used as the area 71, and 4 information bits as the area 72.

The information recording/reproducing apparatus can recognize the card type of the optical card inserted in the apparatus by reading the information recorded in the area 72 of track ID part 4.

According to the present embodiment, because of recording information regarding the type of card in the area that is not used in the optical cards heretofore in use, it is not necessary to provide a mark for showing the card type at a data track as described in JP-A-62-239345. Thus, the recording capacity of the optical card is not decreased.

The area 72 may preferably be provided at each track ID part 4, so as to avoid it being necessary to reproduce a specific track of the optical card to recognize a card type and it being possible to recognize a card type even if the apparatus does not reproduce every track ID part 4. Thus, recording and/or reproducing can be performed quickly.

Figure 8:
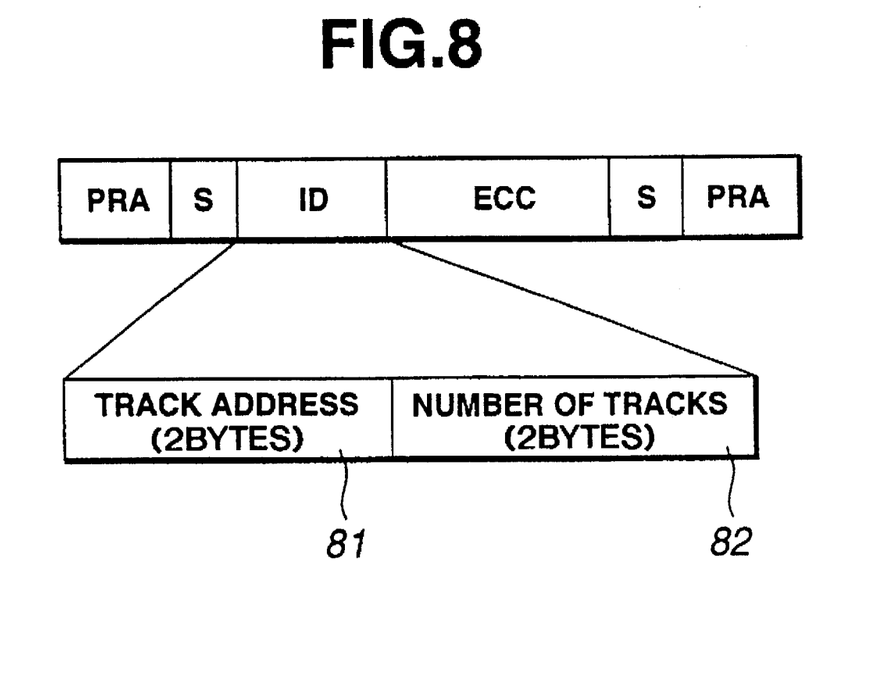
FIG. 8 illustrates a composition of a field of an optical card's track ID part according to a second embodiment of the present invention.

FIG. 8 is a schematic view for illustrating the composition of a track ID part 4 of a second embodiment of an optical card according to the present invention.

This optical card is different from the composition of identification field (ID) in the track ID part 4. That is, the optical card according to the second embodiment has an identification field (ID) comprising an area 81 which shows a track address, and an area 82 which shows a number of tracks. Each area has a capacity of 2 bytes. In the area 81, the track address of each data track, for example, the track number, is recorded in the form of a binary code, and in the area 82, the number of the data tracks is recorded in the form of a binary code.

The information recording and/or reproducing apparatus can identify the number of tracks by reproducing the area 82.

According to this embodiment, it is possible to make the apparatus identify all kinds of optical cards having different numbers of tracks by recording the number of tracks directly, and it is possible to deal with an increase of the number of tracks in the future without changing the format of the optical card.

Further, in this embodiment, the identification field (ID) has a capacity of 4 bytes, so that the identification field (ID) is larger than the identification field of the optical card of the first embodiment by 2 bytes. If the length of 1 bit is 5 μm, the length of the identification field of the present embodiment is longer than that of the first embodiment by 80 μm.

According to this embodiment, the area 82 may preferably be provided at each track ID part 4 so that it is not necessary to reproduce a specific track of the optical card to identify a number of tracks. Thus, recording and/or reproducing can be done quickly.

Figure 9A:
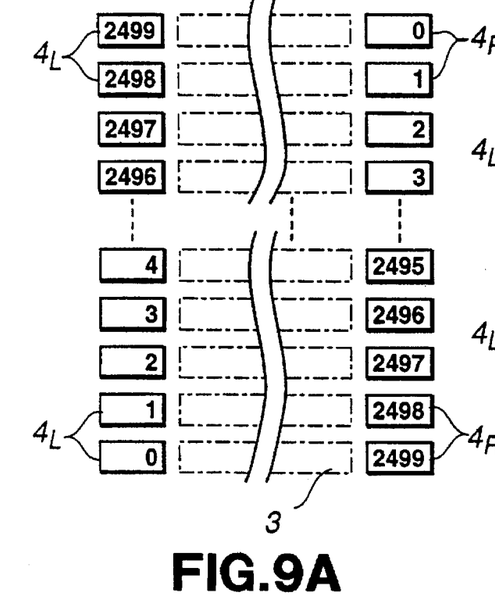
FIGS. 9(a) and 9(b) illustrate a composition of optical cards according to a third embodiment of the present invention.
Figure 9B:
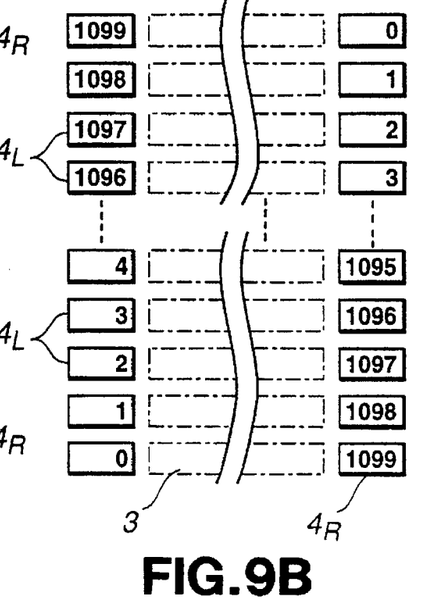

FIGS. 9(a) and 9(b) are typical views for illustrating the composition of a third embodiment of an optical card according to the present invention. Referring to FIG. 9(a), the optical card has 2500 data tracks 3, and has track ID parts 4L, 4R at both ends of each data track, with a track number corresponding to each data track being in the track ID part. In FIG. 9(a), each track number is indicated as a value in order to explain the optical card of this embodiment, but, in practice, the track number will be recorded in the track ID part 4 in the form of a binary code.

Referring to FIG. 9(a), the track numbers are recorded in the sequence 0 to 2499 from the lower data track towards the upper data track in the track ID parts 4L provided at the left end of each data track.

On the other hand, the track numbers recorded in the sequence 0 to 2499 from the upper data track towards the lower data track in the track ID parts 4R are provided at the right end of each data track. Thus, referring to the same data track, the sum of the track number recorded in the track ID part 4L and the track number recorded in the track ID part 4R is always 2499. This value is a maximum value of the track number, and corresponds to the numbered data tracks 0 to 2499. This value corresponds a number of tracks of the optical card according to the third embodiment. That is, referring to the optical card, the sum of the track number recorded in the track ID part 4L and the track number recorded in the track ID part 4R equals a value equal to the number of the data tracks minus 1.

If, however, the data tracks are numbered from 1, the sum of the track number recorded in the track ID part 4L and the track number recorded in the track ID part 4R will equal the number of data tracks plus 1, that is, 2501.

Referring to FIG. 9(b), the optical card has 1100 data tracks 3, and has track ID parts 4L, 4R at both ends of each data track, and a track number corresponding to each data track is recorded in the track ID part.

In FIG. 9(b), each track number is again indicated as a value to explain the optical card of this embodiment, but in practice the track number will be recorded at the track ID part 4 in the form of a binary code.

Referring to FIG. 9(b), track numbers are recorded in each track ID part 4L from an upper data track toward a lower data track to be numbered 1099, 1098, 1097, . . . , 3, 2, 1, 0. Track numbers are recorded in each track ID part 4L from the upper data track towards the lower data track in the sequence 0, 1, 2, 3, . . . , 1097, 1098, 1099. Referring to this optical card, the sum of the track number recorded in the track ID part 4L and the track number recorded in the track ID part 4R is always 1099, this value equalling the maximum value of the track number.

As described above, when the track numbers are recorded in the track ID parts 4L and 4R in a sequence from the same number at the track ID part 4L, and are numbered in the reverse sequence and the sum of the track number recorded in the track ID part 4L and the track number recorded in the track ID part 4R always corresponds to the number of tracks, and will be different among optical cards having a different number of tracks.

Thus, when an optical card as shown in FIG. 9(a) or FIG. 9(b) is inserted into the information recording and/or reproducing apparatus, the apparatus can identify the type of optical card from the sum of the track number recorded in the track ID part 4L and the track number recorded in the track ID part 4R. In this embodiment, it is not necessary for the apparatus to read specific data track's track ID parts, as the apparatus can identify a type of an optical card by reproducing the desired data track's track ID parts 4L and 4R. Accordingly, the apparatus can quickly record and/or reproduce information using an optical card according to this embodiment.

Hitherto, there have been known optical cards having track ID parts at both ends of each data track, with the same track number being recorded at each end, because the information recording and/or reproducing apparatus is thus able to identify the track number before scanning the data track, whichever side the apparatus starts scanning the data track from.

In an optical card according to this embodiment, the track numbers recorded in the track ID part 4L and a track number recorded in the track ID part 4R are different at the same data track.

Thus, it may be preferable to identify to the apparatus either the track number recorded in track ID part 4L or recorded in track ID part 4R as a reference track number, and whose track number is reproduced, which is not the identified reference number, the reference track number being reproduced by the apparatus from the reproduced track number and the number of data tracks which is calculated by the apparatus from the track number recorded in the track ID parts 4L and 4R.

For example, referring to the optical card shown in FIG. 9(a), when the track number recorded in track ID part 4L is defined as the reference track number of each data track, and the apparatus reproduces the track number of track ID part 4R first, the track number may be subtracted from 2499 to provide a reference track number. In a case that the track number of track ID part 4R is 2496, the reference track number is provided as follows:

2499−2496=3.

This value coincides with the reference track number recorded in track ID part 4L.

As described above, by providing the apparatus with an operating means, the apparatus can identify a track number of each data track even when the apparatus reproduces the data track from the side other than that in which the track numbers are recorded.

Hitherto, in known optical cards, the automatic tracking control means has been known to become out of control due to dust attached to a surface of the optical card or flaws in the optical card, causing the optical head to miss a data track during recording and/or reproducing, the optical head then starting to scan another data track uncontrollably.

Hitherto, such an error can be detected, because of the difference between the track number which is reproduced before scanning and the track number which is reproduced after scanning.

In an optical card according to this embodiment of the invention, the error described above can be detected because the sum of the track number which is reproduced before scanning and the track number which is reproduced after scanning is different from the total number of data tracks.

In the embodiment described above, the track number recorded in the track ID part 4L is numbered from the lowest data track towards the upper data track, and the track number recorded in the track ID part 4R is numbered from the upper data track towards the lower data track. However, the sequences of the track numbers may be reversed.

Further, in the embodiment described, the track number starts from 0, but the minimum value of the track number is not limited to this.

Figure 10A:
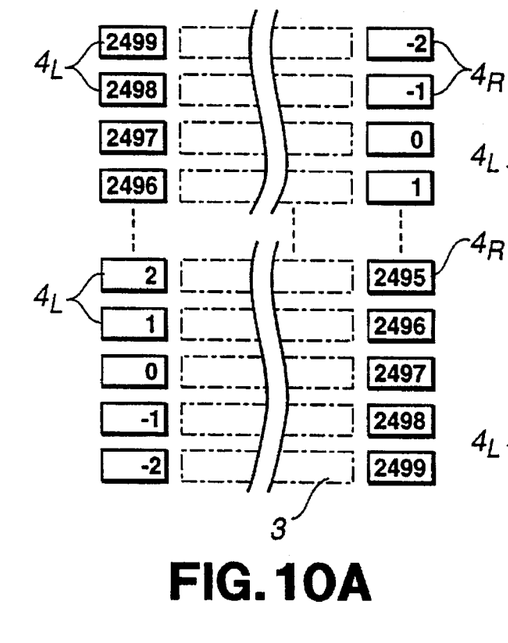
FIGS. 10(a) and 10(b) are schematic views illustrating optical cards according to the third embodiment of the present invention.
Figure 10B:
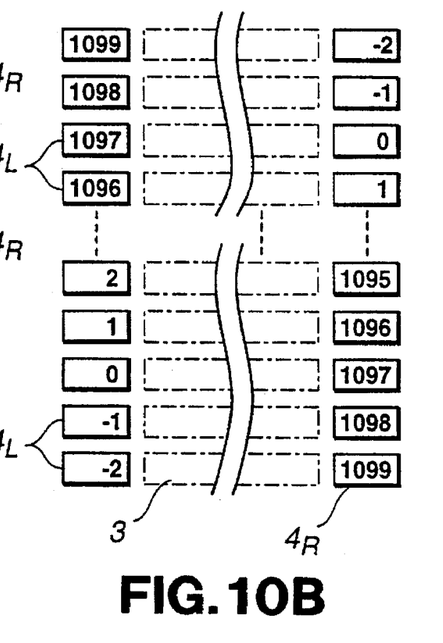

FIGS. 10(a) and 10(b) are schematic views illustrating optical cards according to a third embodiment of the present invention. Referring to FIG. 10(a), the optical card has 2502 data tracks, while in FIG. 10(b), the optical card has 1102 data tracks. These optical cards are the same as the optical cards shown in FIGS. 9(a) and 9(b) except that the number of data tracks and the start number of the track number is 2. Thus, referring to FIG. 10(a), the maximum value of the track number is 2499 and the sum of track numbers 4L and 4R at the same track is 2497. Referring to FIG. 10(b), the maximum value of the track number is 1099, and the sum of track numbers 4L and 4R at the same track is 1097. Referring to the optical card shown in FIG. 10(a), when the track number recorded in track ID part 4R is defined as the reference track number of each data track, and the apparatus first reproduces the track number track ID part 4L, the track number may be subtracted from 2497 to provide a reference track number. In a case that the track number of track ID part 4L is 2497, the reference track number is provided as follows:

2497−2498=−1.

This value coincides with the reference track number recorded in track ID part 4R.

Hereinabove, three embodiments of optical cards are explained for the information recording and/or reproducing apparatus according to the present invention. However, in optical cards used by an information recording and/or reproducing apparatus according to the present invention, the information about the number of the data tracks may sometimes be recorded in same form (for example, a recording position, recording method, etc.) so as to increase reproducing reliability of the information at the initial action.

As described above, according to an information recording and/or reproducing apparatus of the present invention, by using an optical recording medium recorded with information about the number of tracks in the form of an optically detectable mark, the invention is able to prohibit an optical head from trying to access a data track which does not exist on the optical recording medium because the optical head's movement in the direction of crossing the tracks can be controlled according to the information about the number of the tracks reproduced and memorized at the initial action. Thus, there is provided an information recording and/or reproducing apparatus which is able to be used with various kinds of optical recording mediums having different numbers of tracks.

In particular, when the upper control means requests access to a track number which does not exist actually on the optical recording medium inserted into the information recording and/or reproducing apparatus, the apparatus prevents access of the optical head to the track. Thus, errors are prevented.

It will be seen that according to the present invention, there is provided an optical recording medium on which can be identified the type of optical recording medium without providing a specific mark which would decrease the recording capacity of the optical recording medium.

Further, according to the third embodiment of the optical recording medium, it is possible for an information recording and/or reproducing apparatus to identify a number of data tracks by recording a track number in track ID parts 4L and 4R which are numbered such that the track numbers increase in one direction in the ID part 4L and increase in the opposite direction in the track ID part 4R, the apparatus calculating the sum of the track numbers from the track ID parts 4L and 4R at the same data track.

Thus, according to the present invention, there is provided an optical recording medium which can identify the number of data tracks to the information recording reproducing apparatus easily without providing a special mark which shows the type of optical recording medium.

It will be appreciated that an optical recording and/or reproducing apparatus and an optical recording medium in accordance with the invention may take the form of a magneto-optical recording and/or reproducing apparatus and recording medium.

What is claimed is:

1. An information recording and reproducing apparatus for use with an optical recording medium having a plurality of tracks, comprising:

an optical head which irradiates the optical recording medium with a light beam and detects reflected light from the optical recording medium;

means for driving the optical head to move the optical head to a desired track; and means for controlling the apparatus to read information about a number of the tracks on the optical recording medium, and to memorize the information as an initial action, and then controlling the means for driving to move the optical head within a range dependent on the memorized information, the means for controlling the apparatus being arranged to compare a track number to be accessed with the range, and to produce an error signal without moving the optical head towards the track when the track number is not within the range.

2. An information recording and reproducing apparatus according to claim 1, wherein the tracks are parallel with each other, and the means for driving the optical head is arranged to move the optical head in the direction in which the optical head crosses the tracks.

3. An optical recording and reproducing apparatus according to claim 1 or claim 2, wherein said information is recorded as optically readable information and said apparatus includes means for reading said information optically.

4. An information recording method for an information recording medium provided with a plurality of data tracks having information about a number of tracks, the method comprising the steps of:

providing an information recording apparatus comprising an optical head and a driving means to move the optical head to a desired data track, inserting an information recording medium into the apparatus;

reproducing the information and memorizing the range of accessible tracks of the information recording medium according to the information on the tracks;

comparing a track address which is indicated by an input signal to the apparatus with the range;

moving the optical head to a data track having the track address when the track address is within the range to record information; and sending out an error signal without moving the optical head when the track address is not within the range.

5. An information reproducing method for an information recording medium provided with a plurality of data tracks and having information about a number of the tracks, the method comprising the steps of:

providing an information reproducing apparatus comprising an optical head, and a driving means for moving the optical head to a desired data track;

inserting an information recording medium into the apparatus;

reproducing the information and memorizing a range of accessible tracks of the information recording medium according to the information on the tracks;

comparing a track address which is indicated by an input signal to the apparatus with the range;

moving the optical head to a data track having the track address when the track address is within the range to reproduce information; and sending out an error signal without moving the optical head when the track address is not within the range.

6. An information recording apparatus for use with an optical recording medium having a plurality of tracks, comprising:

an optical head which irradiates the optical recording medium with a light beam and detects reflected light from the optical recording medium;

means for driving the optical head to move the optical head to a desired track; and means for controlling the apparatus to read information about a number of the tracks on the optical recording medium, and to memorize the information as an initial action, and then controlling the means for driving to move the optical head within a range dependent on the memorized information, the means for controlling the apparatus being arranged to compare a track number to be accessed with the range, and to produce an error signal without moving the optical head towards the track when the track number is not within the range.

7. An information recording apparatus according to claim 6, wherein the tracks are parallel with each other, and the means for driving the optical head is arranged to move the optical head in the direction in which the optical head crosses the tracks.

8. An information recording apparatus according to claim 6 or 7, wherein said information is recorded as optically readable information and said apparatus includes means for reading said information optically.

9. An information reproducing apparatus for use with an optical recording medium having a plurality of tracks, comprising:

an optical head which irradiates the optical recording medium with a light beam and detects reflected light from the optical recording medium;

means for driving the optical head to move the optical head to a desired track; and means for controlling the apparatus to read information about a number of the tracks on the optical recording medium, and to memorize the information as an initial action, and then controlling the means for driving to move the optical head within a range dependent on the memorized information, the means for controlling the apparatus being arranged to compare a track number to be accessed with the range, and to produce an error signal without moving the optical head towards the track when the track number is not within the range.

10. An information reproducing apparatus according to claim 9, wherein the tracks are parallel with each other, and the means for driving the optical head is arranged to move the optical head in the direction in which the optical head crosses the tracks.

11. An information reproducing apparatus according to claim 9 or 10, wherein said information is recorded as optically readable information and said apparatus includes means for reading said information optically.

* * * * *

UNITED STATES PATENT AND TRADEMARK OFFICE
CERTIFICATE OF CORRECTION

PATENT NO. : 5,638,345
DATED : June 10, 1997
INVENTOR(S) : HIDEKI HOSOYA

It is certified that error appears in the above-identified patent and that said Letters Patent is hereby corrected as shown below:

Column 2

Line 1, "convention" should read --conventional--.
Line 27, "overall" should read --an overall--.

Column 4

Line 5, "— an" should read --, an--.

Column 6

Line 66, "Correction" should read --correction--.

Column 7

The following should be inserted, as a paragraph, after line 25:

--In case the area 72 has 4 information bits, it can indicate 16 types of optical cards, which is enough for practical use.--.

Column 8

Line 9, "being in" should read --being recorded in--.
Line 26, "corresponds" should read --corresponds to--.

UNITED STATES PATENT AND TRADEMARK OFFICE
CERTIFICATE OF CORRECTION

PATENT NO. : 5,638,345
DATED : June 10, 1997
INVENTOR(S) : HIDEKI HOSOYA

It is certified that error appears in the above-identified patent and that said Letters Patent is hereby corrected as shown below:

<u>Column 9</u>

Line 2, "read" should read --read a--.

Signed and Sealed this

Twenty-fourth Day of February, 1998

Attest:

BRUCE LEHMAN

*Attesting Officer*    *Commissioner of Patents and Trademarks*